United States Patent
Yang

(10) Patent No.: US 10,507,726 B2
(45) Date of Patent: Dec. 17, 2019

(54) POP-UP DEVICE OF FUEL DOOR

(71) Applicants: Hyundai Motor Company, Seoul (KR); Kia Motors Corporation, Seoul (KR)

(72) Inventor: Seung-Jun Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 107 days.

(21) Appl. No.: 15/823,900

(22) Filed: Nov. 28, 2017

(65) Prior Publication Data

US 2018/0170176 A1 Jun. 21, 2018

(30) Foreign Application Priority Data

Dec. 15, 2016 (KR) .................. 10-2016-0171444

(51) Int. Cl.
*B60K 15/05* (2006.01)

(52) U.S. Cl.
CPC ........ *B60K 15/05* (2013.01); *B60K 2015/053* (2013.01); *B60K 2015/0576* (2013.01)

(58) Field of Classification Search
CPC ............ B60K 15/05; B60K 2015/0584; B60K 2015/0515; B60K 2015/053; B60K 2015/0576
USPC .............................................. 296/97.22, 37.1
See application file for complete search history.

(56) References Cited

U.S. PATENT DOCUMENTS

| | | | | |
|---|---|---|---|---|
| 5,044,678 A * | 9/1991 | Detweiler | ............. | E05B 47/026 292/144 |
| 5,836,638 A * | 11/1998 | Slocum | .................. | B60K 15/05 296/97.22 |
| 5,906,406 A * | 5/1999 | Pajakowski | ............ | B60K 15/05 220/86.2 |
| 6,189,959 B1 * | 2/2001 | VanAssche | ............ | B60K 15/05 16/86 B |
| 6,499,789 B2 * | 12/2002 | Moll | ...................... | B60K 15/05 292/28 |
| 7,185,938 B2 * | 3/2007 | Beck | ...................... | B60K 15/04 292/207 |
| 8,556,327 B1 * | 10/2013 | Higgins | ................. | B60K 15/05 296/97.22 |
| 8,616,609 B2 * | 12/2013 | Ogata | .................... | B60K 15/05 296/97.22 |
| 2009/0026794 A1 * | 1/2009 | Zentner | .................. | B60K 15/05 296/97.22 |
| 2014/0084620 A1 * | 3/2014 | Frommann | ............ | B60K 15/05 296/97.22 |

(Continued)

FOREIGN PATENT DOCUMENTS

KR 10-2013-0043411 A 4/2013

*Primary Examiner* — Jason S Morrow
*Assistant Examiner* — E Turner Hicks
(74) *Attorney, Agent, or Firm* — Morgan, Lewis & Bockius LLP

(57) ABSTRACT

A pop-up device of a fuel door may include a fuel door configured to be rotatably provided on one side of a vehicle body to open or close a fuel inlet and have a locking portion formed on an internal side thereof, a cable housing configured to be disposed on an internal side of the fuel inlet and include a stopper connected to a cable, and a catch configured to be formed on one end portion of the cable housing and open or close the fuel door by a reciprocating movement of the pop-up rod.

9 Claims, 9 Drawing Sheets

(56) References Cited

U.S. PATENT DOCUMENTS

| | | | |
|---|---|---|---|
| 2015/0337569 A1* | 11/2015 | Lim | E05B 83/34 292/197 |
| 2016/0108648 A1* | 4/2016 | Nam | E05B 83/34 292/142 |
| 2016/0280061 A1* | 9/2016 | Desai | B29C 45/1676 |

* cited by examiner

POP-UP DEVICE OF FUEL DOOR

CROSS-REFERENCE(S) TO RELATED APPLICATIONS

The present application claims priority to Korean Patent Application No. 10-2016-0171444, filed on Dec. 15, 2016, the entire contents of which is incorporated herein for all purposes by this reference.

BACKGROUND OF THE INVENTION

Field of the Invention

The present invention relates to a pop-up device of a fuel door, and more particularly, to a pop-up device of a fuel door in which a 'T'-shaped pop-up rod is inclinedly popped-up on a fuel door catch to pop-up the fuel door to improve user convenience and minimize interference between a housing and the fuel door when the fuel door is open.

Description of Related Art

In a general vehicle, a vehicle body is provided with a fuel tank in which fuel may be stored and a filler pipe for injecting fuel into the fuel tank extends to an external panel of the vehicle body to form a fuel inlet.

The fuel inlet is provided with a cap and the external panel of the vehicle body is provided with a fuel door, in which the fuel door is manually or automatically open or closed so that the fuel inlet is exposed to the outside when the fuel is injected.

FIG. 1 illustrates a fuel door structure according to the related art. Referring to FIG. 1, the fuel door structure includes a fuel door 10, a fuel door locking portion 11, a fuel door housing 20, a pop-up spring 30, and a catch 40.

The fuel door structure according to the related art is subjected to not only a creep deformation due to a persistent load of the pop-up spring, but also a deformation to one side of the fuel door, and as a result has the problem in that a malfunction of the fuel door may occur due to the interference between the catch and the housing and the fuel door is not open when the fuel door is frozen.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pop-up device of a fuel door including a cable housing that includes a stopper connected to a cable and a catch that opens and closes the fuel door by a pop-up rod formed on one end portion of the cable housing and inclinedly popped-up to prevent a persistent load from acting on the fuel door, preventing a malfunction of the fuel door and preventing the fuel door from being deformed.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a pop-up device of a fuel door may include a fuel door configured to be rotatably provided on one side of a vehicle body to open or close a fuel inlet and have a locking portion formed on an internal side thereof; a cable housing configured to be disposed on an internal side of the fuel inlet and include a stopper connected to a cable; and a catch configured to be formed on one end portion of the cable housing and open or close the fuel door by a reciprocating movement of the pop-up rod.

An upper end portion of the pop-up rod may be inserted into the locking portion during a lowering operation to lock the fuel door and released from a coupling with the locking portion during a lifting operation to open the fuel door.

The catch may include: a catch housing of which the upper end portion is provided with an inclined portion having a predetermined angle; a pop-up rod configured to be reciprocatively disposed inside the catch housing; and a pushing block configured to be formed to abut to a lower portion of the pop-up rod.

An upper surface of the pushing block may be formed to be inclined at the same angle as the inclined portion.

The upper end portion of the pop-up rod may be formed in a "T"-letter shape and one side of a lower end portion of the pop-up rod may be provided with a protruding block locked by the stopper.

A lower surface of the protruding block may be formed in a plane perpendicular to a longitudinal direction of the pop-up rod.

A least one side of the protruding block may be provided with a locking protrusion.

The locking protrusion may be formed in the catch housing and may be guided by a guide groove formed to be inclined at a predetermined angle.

When the protruding block is positioned on the inclined portion, the lower end portion of the pop-up rod may be inclined to correspond to the angle of the inclined portion.

When the protruding block is positioned on the inclined portion, the lower surface of the protruding block and an upper surface of the pushing block may be face-to-face coupled with each other.

When the cable is pulled, the stopper may move to one side to release a position regulation of the protruding block and the pop-up rod may be lifted by a spring force of a spring formed at a lower portion of the catch housing.

An upper portion of the inclined portion may be provided with a sealing portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
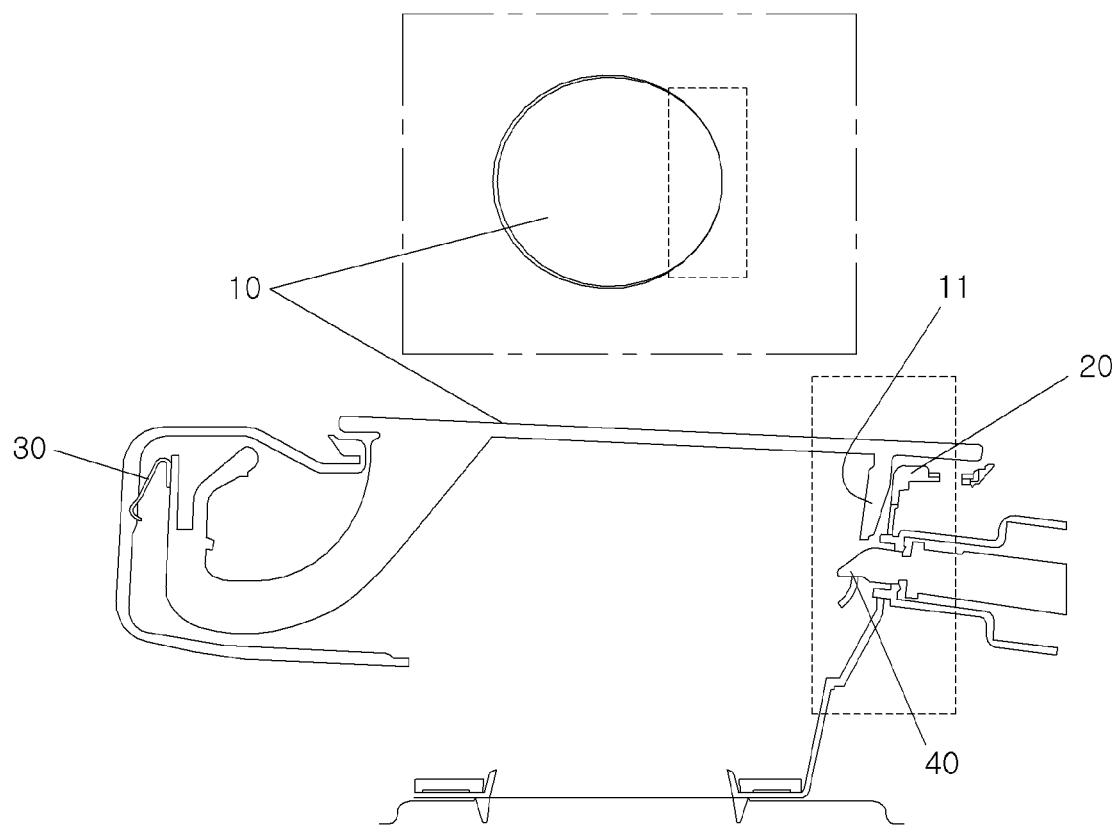
FIG. 1 is a cross-sectional view illustrating a fuel door structure according to the related art.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms and words used in the present embodiment and claims are not to be construed as a general or dictionary meaning but are to be construed meaning and concepts meeting the technical ideas of the present invention based on a principle that the inventors can appropriately define the concepts of terms to describe their own inventions in best mode. Therefore, the configurations described in the exemplary embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing the present application. In the present embodiment, an overlapped description and a detailed description for well-known functions and configurations that may obscure the gist of the present invention will be omitted. Hereinafter, exemplary embodiments of the present invention will be described in detail with reference to the accompanying drawings.

Figure 2A:
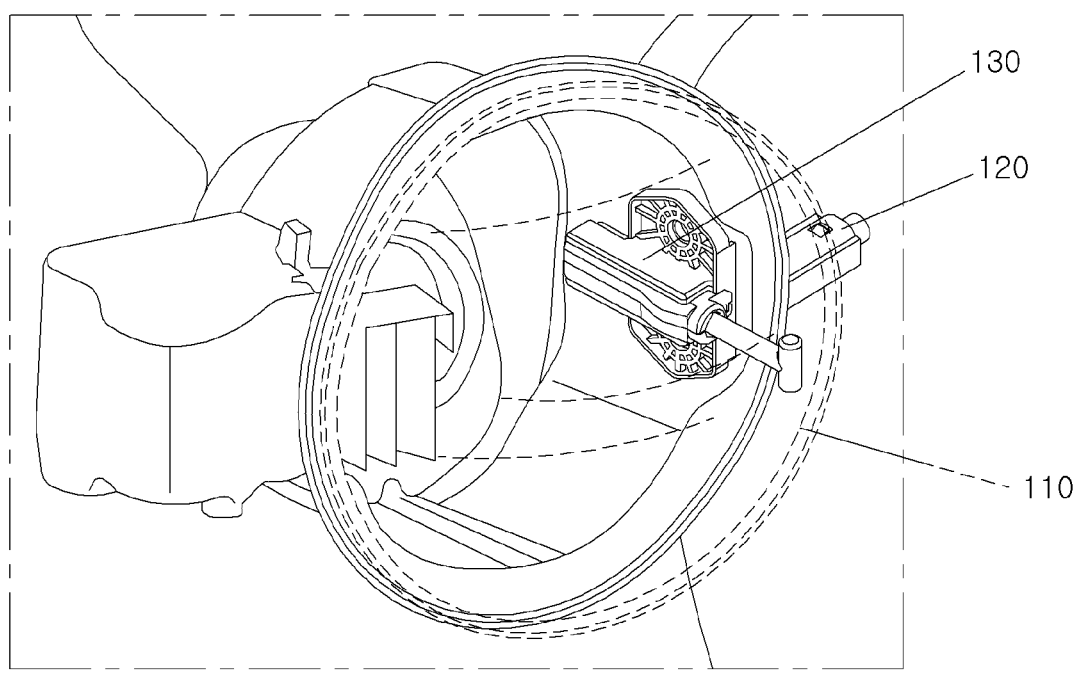
FIG. 2A is a diagram schematically illustrating a pop-up device of a fuel door according to an exemplary embodiment of the present invention.
Figure 2B:
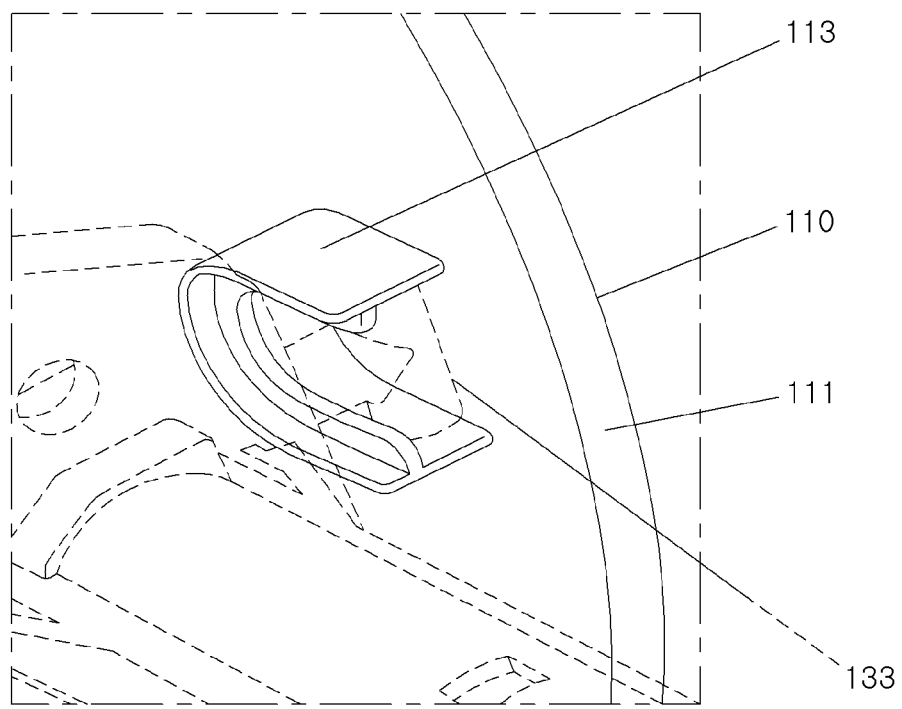
FIG. 2B is a diagram schematically illustrating a coupling of a pop-up rod with a locking portion according to an exemplary embodiment of the present invention.

FIG. 2A is a diagram schematically illustrating a pop-up device of a fuel door according to an exemplary embodiment of the present invention and FIG. 2B is a diagram schematically illustrating a coupling of a pop-up rod with a locking portion according to an exemplary embodiment of the present invention.

Referring to FIG. 2A and FIG. 2B, a pop pop-up device of a fuel door according to an exemplary embodiment of the present invention includes a fuel door 110 that is rotatably provided on one side of a vehicle body to open or close a fuel inlet and has a locking portion 113 formed on an internal side thereof, a cable housing 120 that is disposed on an internal side of the fuel inlet and includes a stopper 123 connected to a cable 129, and a catch 130 that is formed on one end portion of the cable housing 120 and opens and closes the fuel door 110 by a reciprocating movement of the pop-up rod 132.

The fuel door 110 is configured to open or close the fuel inlet for injecting fuel which is disposed on one side of a vehicle body.

The fuel door 110 is rotatably disposed by a hinge structure.

The fuel door 110 includes a fuel door main body 111 and a locking portion 113. The fuel door main body 111 may be formed in a circular shape but is not limited thereto, and therefore the fuel door main body 111 may be formed in various shapes.

The locking portion 113 is formed on an internal side of the fuel door main body 111 to close the fuel door while an upper end portion 133 of the pop-up rod 132 is inserted and to open the fuel door while the upper end portion 133 of the pop-up rod 132 is separated from the locking portion 113.

That is, the upper end portion 133 of the pop-up rod is inserted into the locking portion 113 during the lowering operation to lock the fuel door 110 and released from the coupling with the locking portion 113 during the lifting operation to open the fuel door 110.

At the present point, the pop-up rod 132 is inclined at a predetermined angle during the lifting operation to be easily separated from the locking portion 113 and is vertically lowered during the lowering operation to be easily coupled with the locking portion 113.

Figure 3A:
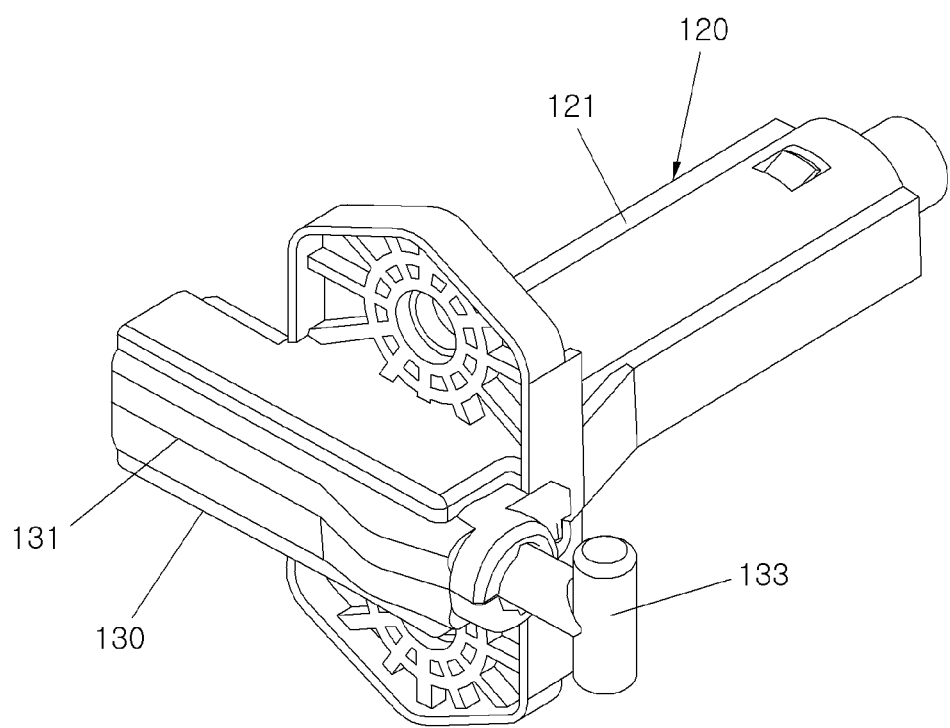
FIG. 3A is a coupled perspective view of a cable housing and a catch according to an exemplary embodiment of the present invention.
Figure 3B:
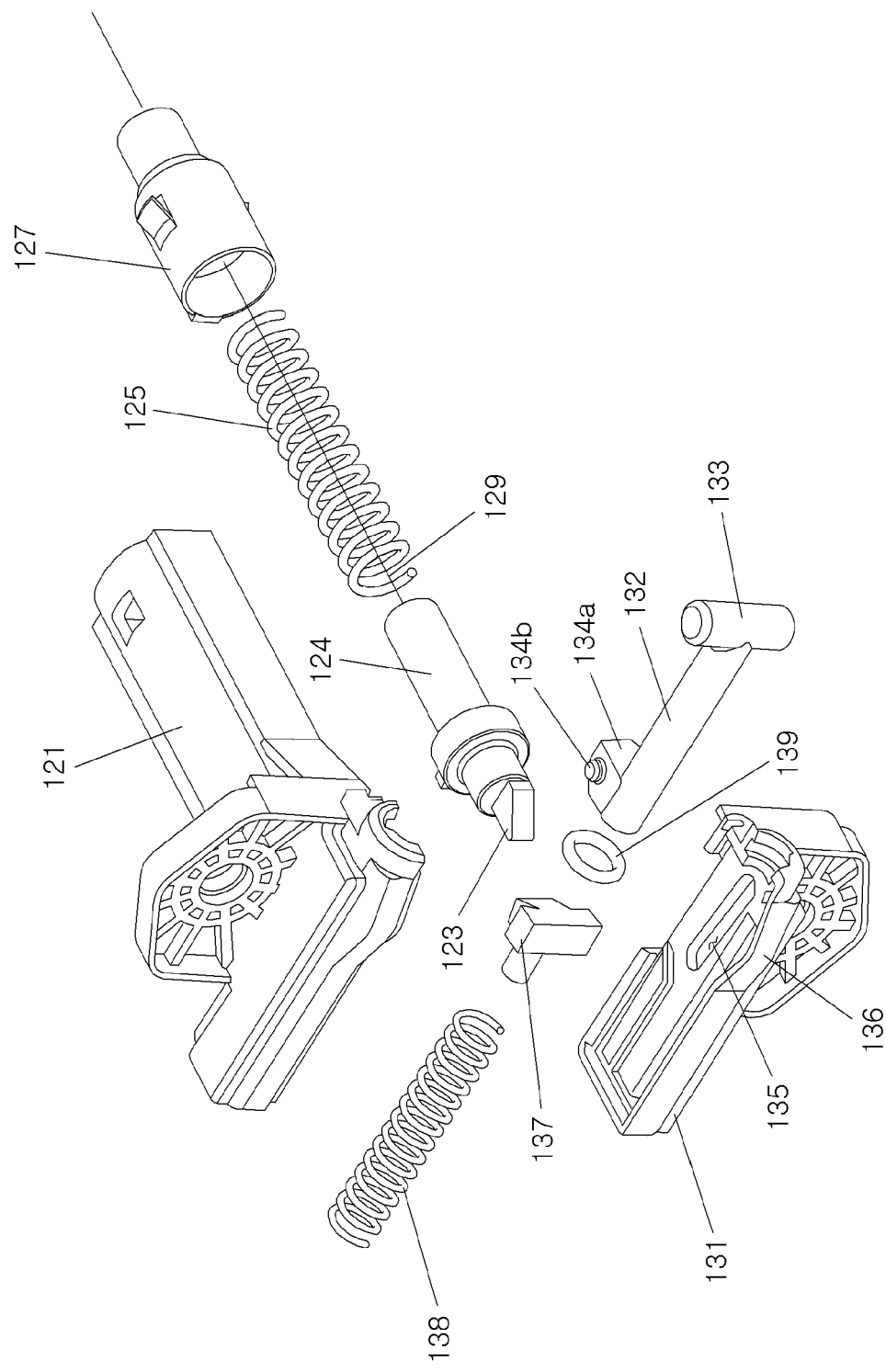
FIG. 3B is an exploded perspective view of the cable housing and the catch according to the exemplary embodiment of the present invention.

FIG. 3A is a coupled perspective view of the cable housing and the catch according to the exemplary embodiment of the present invention, and FIG. 3B is an exploded perspective view of the cable housing and the catch according to the exemplary embodiment of the present invention.

Referring to FIG. 3A and FIG. 3B, the cable housing 120 includes a cover 121, a stopper 123, a stopper rod 124, a cable housing spring 125, and a cable 129.

When the cable 129 is pulled back in the state where the movement of the pop-up rod 132 inside the catch 130 is restricted by the stopper 123, the stopper 123 moves backward by the stopper rod 124 and thus the pop-up rod 132 is lifted by a spring force.

The catch 130 includes a catch housing 131 of which the upper end portion is provided with an inclined portion 136 having a predetermined angle, a pop-up rod 132 reciprocately disposed inside the catch housing 131, and a pushing block 137 formed at abut to a lower portion of the pop-up rod 132.

The catch housing 131 accommodates and protects the pop-up rod 132, the pushing block 137, the spring 138, and the sealing portion 139, and a predetermined position of an internal surface thereof is provided with a guide groove 135.

The catch housing 131 is coupled with the upper cover 121 of the cable housing 120.

The upper end portion of the catch housing 131 is provided with an inclined portion 136 having a predetermined angle.

When the pop-up rod 132 is positioned at the uppermost position, the inclined portion 136 allows the pop-up rod 132 to be inclined at a predetermined angle, such that when the pop-up rod 132 is lifted, the fuel door 110 is open while the coupling of the pop-up rod 132 with the locking portion 113 is easily released.

The pop-up rod 132 is lifted by an elastic force of the spring 138 to open the fuel door 110, and when the fuel door 110 is closed by an operation of pressing the fuel door 110, the pop-up rod 132 is lowered by coupling the fuel door 110 with the upper end portion 133 of the pop-up rod 132 and thus the movement of the pop-up rod 132 is restricted by the stopper 123.

The upper end portion 133 of the pop-up rod 132 is formed in a "T"-letter shape and one side of a lower end portion of the pop-up rod 132 is provided with a protruding block 134a locked by the stopper 123.

The protruding block 134a may be formed in a rectangular parallelepiped shape but is not limited thereto, and therefore the protruding block 134a may be formed in various shapes. Here, a lower surface of the protruding block 134a is formed in a plane perpendicular to a longitudinal direction of the pop-up rod 132.

At least one side of the protruding block 134a is provided with a locking protrusion 134b, in which the locking protrusion 134b is guided by the guide groove 135 to guide the movement of the pop-up rod 132.

That is, the locking protrusion 134b is formed in the catch housing 131 and is guided by the guide groove 135 formed to be inclined at a predetermined angle.

Therefore, when the pop-up rod 132 is popped-up to be positioned at the upper end portion of the catch housing, one side of the pop-up rod 132 comes into close contact with the inclined portion 136 to be inclined to correspond to the inclination of the inclined portion.

The pushing block 137 is formed so that the lower portion of the pop-up rod 132 comes into contact with the lower surface of the protruding block 134a, safely transmitting a load of the spring 138 to the pop-up rod 132.

An upper surface of the pushing block 137 is formed in a plane, and is formed to be inclined at the same angle as the inclined portion 136.

Therefore, when the protruding block 134a is positioned on the inclined portion 136, the lower end portion of the pop-up rod 132 and the lower surface of the protruding block 134a are inclined to correspond to the angle of the inclined portion 136.

When the protruding block 134a is positioned on the inclined portion 136, the lower surface of the protruding block 134a and the upper surface of the pushing block 137 are face-to-face coupled with each other, such that the pop-up rod 132 maintains a stable posture by the pushing block 137.

The lower portion of the pushing block 137 is formed to have the spring 138 inserted thereinto.

A sealing portion 139 is formed on an upper portion of the inclined portion 136 and the sealing portion 139 protects the catch 130 to prevent moisture or foreign objects from being introduced into the catch 130.

Figure 4:
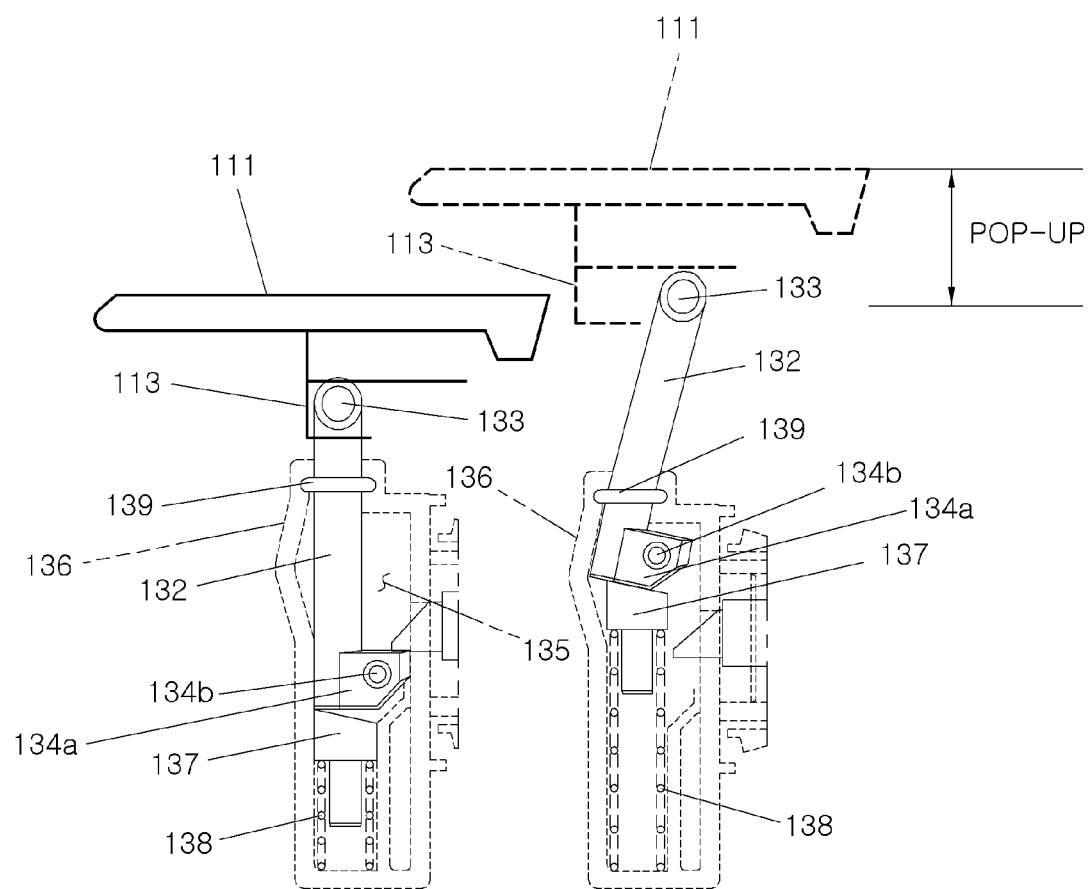
FIG. 4 is a cross-sectional view illustrating a pop-up state of the pop-up device of a fuel door according to the exemplary embodiment of the present invention.
Figure 5A:
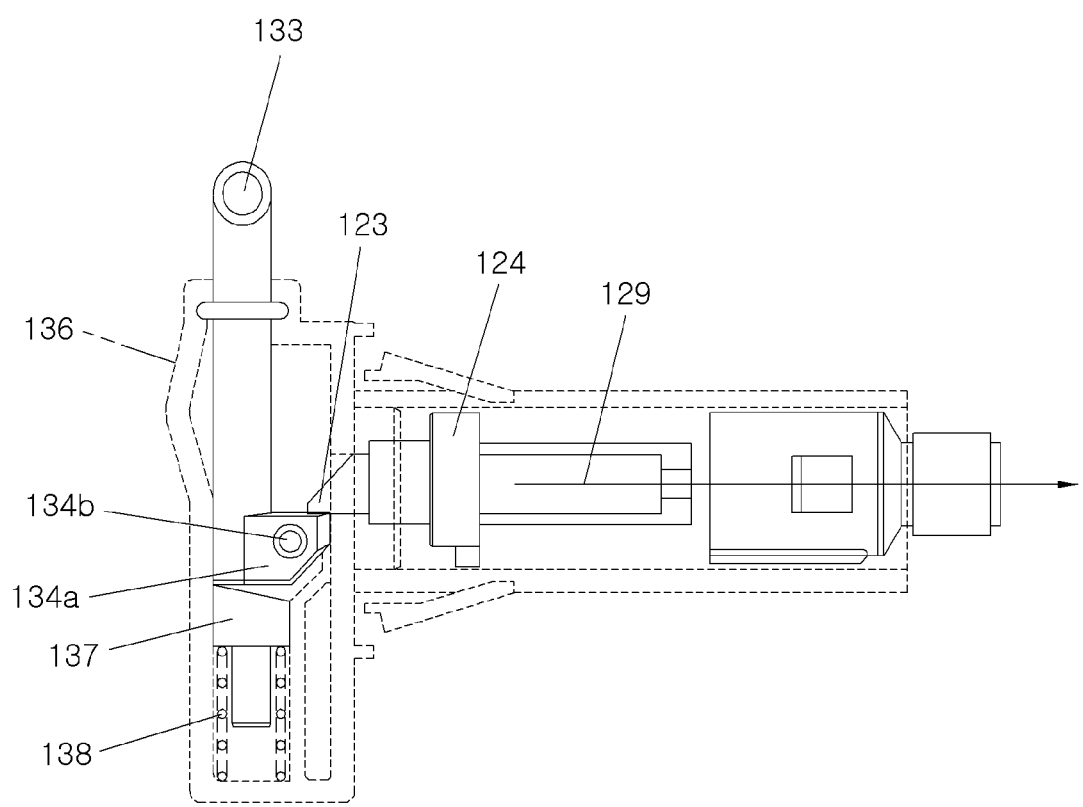
FIG. 5A, FIG. 5B, and FIG. 5C are operational diagrams of a pop-up device of a fuel door according to the exemplary embodiment of the present invention.
Figure 5B:
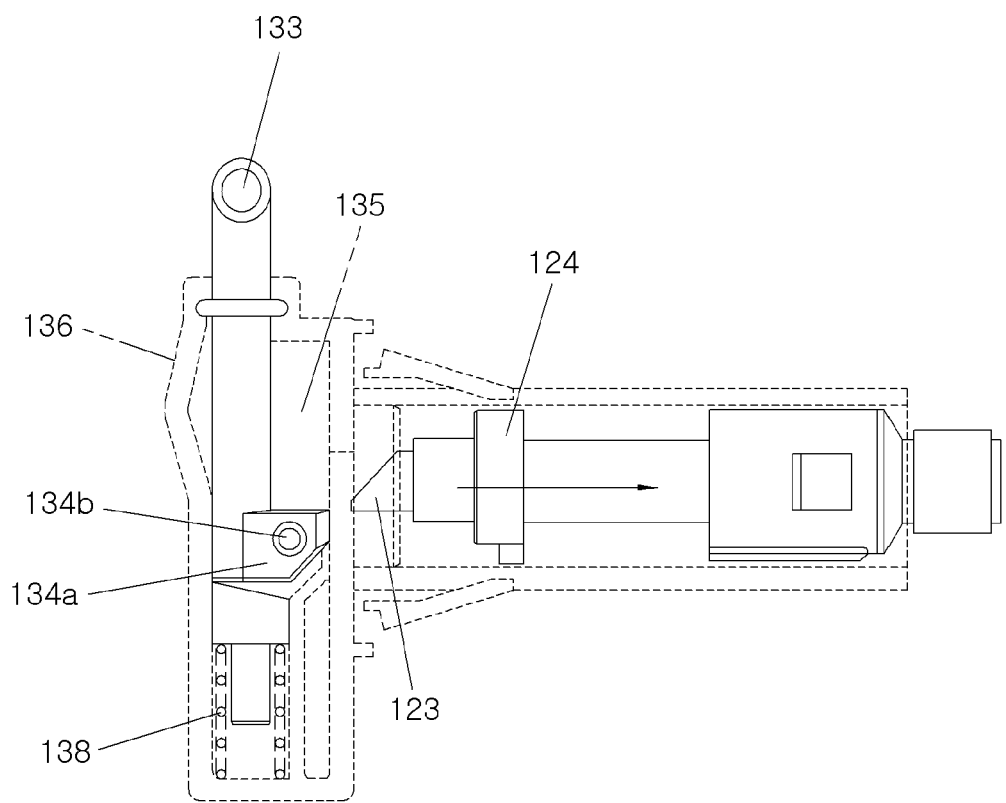
Figure 5C:
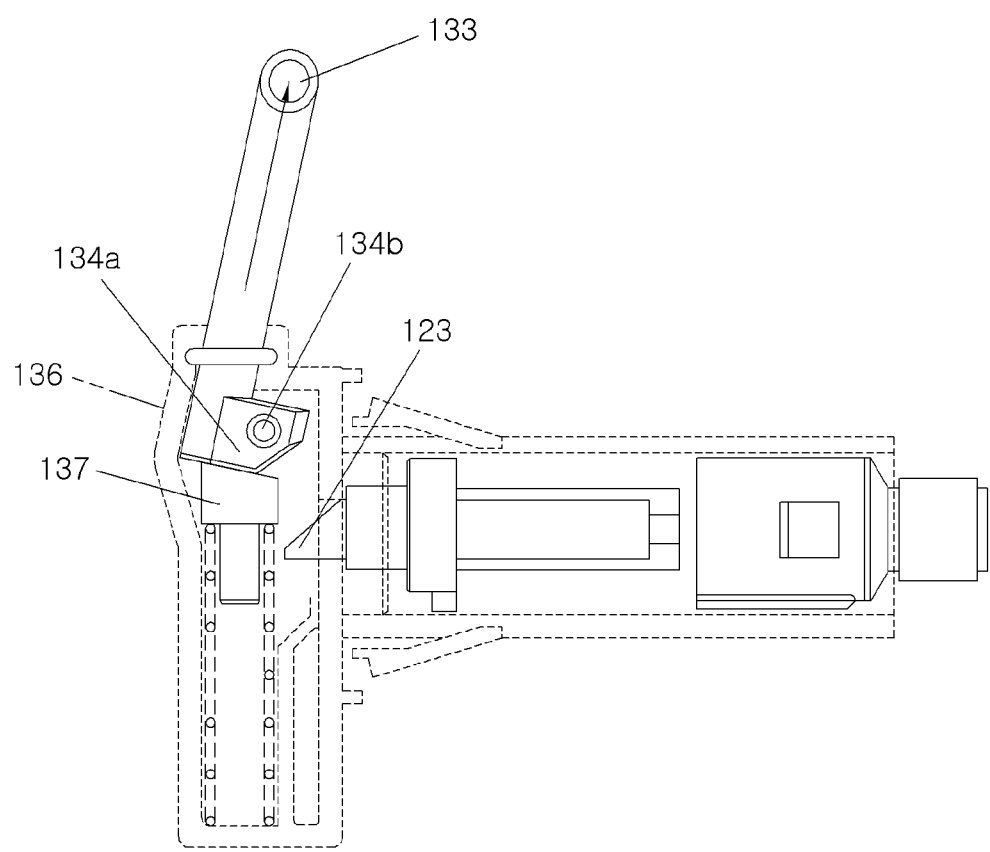

FIG. 4 is a cross-sectional view illustrating a pop-up state of the pop-up device of a fuel door according to the exemplary embodiment of the present invention and FIG. 5A, FIG. 5B, and FIG. 5C are operational diagrams of a pop-up device of a fuel door according to the exemplary embodiment of the present invention.

Referring to FIGS. 4 to 5C, when the cable 129 is pulled back in the state where the movement of the pop-up rod 132 inside the catch 130 is restricted by the stopper 123, the stopper 123 moves backward by the stopper rod 124 and thus the pop-up rod 132 is lifted by the spring force.

The locking protrusion 134b mounted on the lower end portion of the pop-up rod 132 is guided by the guide groove 135 formed to be inclined at a predetermined angle.

At the present point, the fuel door 110 starts to be open while the locking portion 113 is pushed to the upper end portion 133 of the pop-up rod 132 inserted into the locking portion 113 of the fuel door 110, and when the pop-up rod 132 is popped-up and thus the lower end portion of the pop-up rod and the protruding block 134a are positioned on the upper end portion of the catch housing, one side of the lower end portion of the pop-up rod 132 comes into contact with the inclined portion 136 and thus is inclined to correspond to the inclination of the inclined portion 136.

Further, when the lower end portion of the pop-up rod and the protruding block 134a are positioned on the inclined portion 136, the upper end portion 133 of the pop-up rod is released from the coupling with the locking portion 113 but may be formed to be in contact with the upper surface of the locking portion 113.

Further, the pushing block 137 is formed so that the lower portion of the pop-up rod 132 contacts the lower surface of the protruding block 134a, safely transmitting the load of the spring 138 to the pop-up rod 132.

On the contrary, when the fuel door 110 is pressed, the upper surface of the locking portion 113 presses the upper end portion 133 of the pop-up rod to lower the pop-up rod 132, the protruding block 134a formed so that the side opposite to the stopper 123 is inclined returns by the cable housing spring 125, the protruding block 134a is lowered by backward pressing the stopper 123 formed to be inclined, and the protruding block 134a is fixed not to be lifted by the restored stopper 123.

According to the exemplary embodiment of the present invention, it is possible to prevent the malfunction of the fuel door and prevent the fuel door from being deformed by preventing the persistent load from acting on the fuel door while the stopper restricts the movement of the protruding block and the pop-up rod when the fuel door is closed.

In addition, according to the exemplary embodiment of the present invention, the pop-up rod may be inclined at a predetermined angle during the lifting operation to be easily separated from the locking portion and may be vertically lowered during the lowering operation to be easily coupled with the locking portion.

According to the exemplary embodiment of the present invention, when the protruding block is positioned on the inclined portion, the lower surface of the protruding block and the upper surface of the pushing block may be face-to-face coupled with each other and thus the pop-up rod may maintain the stable posture by the pushing block.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pop-up device of a fuel door, the pop-up device comprising:
   the fuel door configured to be rotatably provided on one side of a vehicle body to open or close a fuel inlet and have a locking portion formed on an internal side thereof;
   a cable housing configured to be disposed on an internal side of the fuel inlet and include a stopper connected to a cable; and
   a catch configured to be formed on one end portion of the cable housing and open or close the fuel door by a reciprocating movement of a pop-up rod,
   wherein the catch includes:
      a catch housing of which an upper end portion is provided with an inclined portion having a predetermined angle;
      the pop-up rod configured to be reciprocately disposed inside the catch housing; and
      a pushing block configured to be formed to abut to a lower portion of the pop-up rod,
   wherein an upper end portion of the pop-up rod is formed in a "T"-letter shape and one side of a lower end portion of the pop-up rod is provided with a protruding block locked by the stopper, and
   wherein, when the cable is pulled, the stopper moves toward one side to release a position regulation of the protruding block and the pop-up rod is lifted by a spring force of a spring formed at a lower portion of the catch housing.

2. The pop-up device of the fuel door of claim 1, wherein the upper end portion of the pop-up rod is inserted into the locking portion during a lowering operation to lock the fuel door and released from a coupling with the locking portion during a lifting operation to open the fuel door.

3. The pop-up device of the fuel door of claim 1, wherein an upper surface of the pushing block is formed to be inclined at a same angle as the inclined portion.

4. The pop-up device of the fuel door of claim 1, wherein a lower surface of the protruding block is formed in a plane perpendicular to a longitudinal direction of the pop-up rod.

5. The pop-up device of the fuel door of claim 1, wherein a least one side of the protruding block is provided with a locking protrusion.

6. The pop-up device of the fuel door of claim 5, wherein the locking protrusion is formed in the catch housing and is guided by a guide groove formed to be inclined at a predetermined angle thereof.

7. The pop-up device of the fuel door of claim 1, wherein, when the protruding block is disposed on the inclined portion, the lower end portion of the pop-up rod and a lower surface of the protruding block are inclined to correspond to the predetermined angle of the inclined portion.

8. The pop-up device of the fuel door of claim 4, wherein, when the protruding block is disposed on the inclined portion, the lower surface of the protruding block and an upper surface of the pushing block are face-to-face coupled with each other.

9. The pop-up device of the fuel door of claim 1, wherein an upper portion of the inclined portion is provided with a sealing portion.

* * * * *